United States Patent [19]
Masaki

[11] Patent Number: 4,792,934
[45] Date of Patent: Dec. 20, 1988

[54] DISK PLAYING METHOD FOR MULTI-DISK PLAYER

[75] Inventor: Naoki Masaki, Saitama, Japan

[73] Assignee: Pioneer Electronic Corporation, Tokyo, Japan

[21] Appl. No.: 111,326

[22] Filed: Oct. 22, 1987

[30] Foreign Application Priority Data

Oct. 22, 1986 [JP] Japan .................................. 61-249491

[51] Int. Cl.⁴ ........................ G11B 17/22; G11B 27/19
[52] U.S. Cl. ............................................ 369/34; 369/36
[58] Field of Search ..................... 369/34, 36, 37, 38, 369/39, 33

[56] References Cited

U.S. PATENT DOCUMENTS

| | | | |
|---|---|---|---|
| 3,964,025 | 6/1976 | Oosterhouse | 369/231 |
| 4,180,802 | 12/1979 | Oosterhouse | 369/34 |
| 4,258,838 | 3/1981 | Rockola et al. | 369/34 |
| 4,615,024 | 9/1986 | Usui | 369/63 |
| 4,667,314 | 5/1987 | Iwashima | 369/34 |
| 4,727,528 | 2/1988 | Wyland | 369/33 |

*Primary Examiner*—Steven L. Stephan
*Attorney, Agent, or Firm*—Sughrue, Mion, Zinn, Macpeak and Seas

[57] ABSTRACT

A method for playing tunes from a plurality of disks stored in a magazine in random order and without repeating any one tune. Three memories are provided. In the first there are recorded the identities of disks which have already been played, in the second, the identities of already-played tune S on each disk, and, in the third, an incremental count of the number of already-played tunes on each disk. The tunes are selected in terms of random numbers limited by the number of as-yet-unplayed disks derived from the data stored in the first memory.

6 Claims, 3 Drawing Sheets

DISK PLAYING METHOD FOR MULTI-DISK PLAYER

BACKGROUND OF THE INVENTION

The present invention relates to a disk playing method for a multi-disk player in which a plurality of disks are housed in a magazine, and the disks can be randomly extracted from the magazine and played.

A multi-disk player, in which a plurality of compact disks are housed in a magazine and the disks are sequentially extracted from the magazine and reproduced, has been proposed, manufactured and put on the market by the present applicant.

In this multi-disk player, a plurality of compact disks can be continuously played in the sequence in which the disks are housed in the magazine, in the sequence in which tunes are recorded, in an optionally programmed sequence of disks, in an optionally programmed sequence of recorded tunes, or in the like. However, the playing sequence of the disks is fixed at the start of the playing operation. For that reason, this disk method has the disadvantage that the selection of tunes cannot be done spontaneously.

There is also a demand for a multi-disk player which can play disks for background music of the like in a random sequence upon simply turning on the main switch of the player.

SUMMARY OF THE INVENTION

The disk playing method provided in accordance with the present invention is charcterized in that a first memory for recording the identities of already-played tunes on each disk, a second memory for recording the identities of already-played tunes on each disk, and a third memory for incrementally counting the number of the already-played tunes on each disk and recording the incremental counted number are provided, and as-yet-unplayed disks and as-yet-unplayed tunes are randomly selected in accordance with random numbers created by a random number generator to reproduce all the tunes on all the disks without playing any of the tunes more than once.

DESCRIPTION OF THE PREFERRED EMBODIMENTS

A preferred embodiment of the present invention, which is a disk reproduction method for a multi-disk player for compact disks, will hereafter be described with reference to the drawings.

Figure 1:
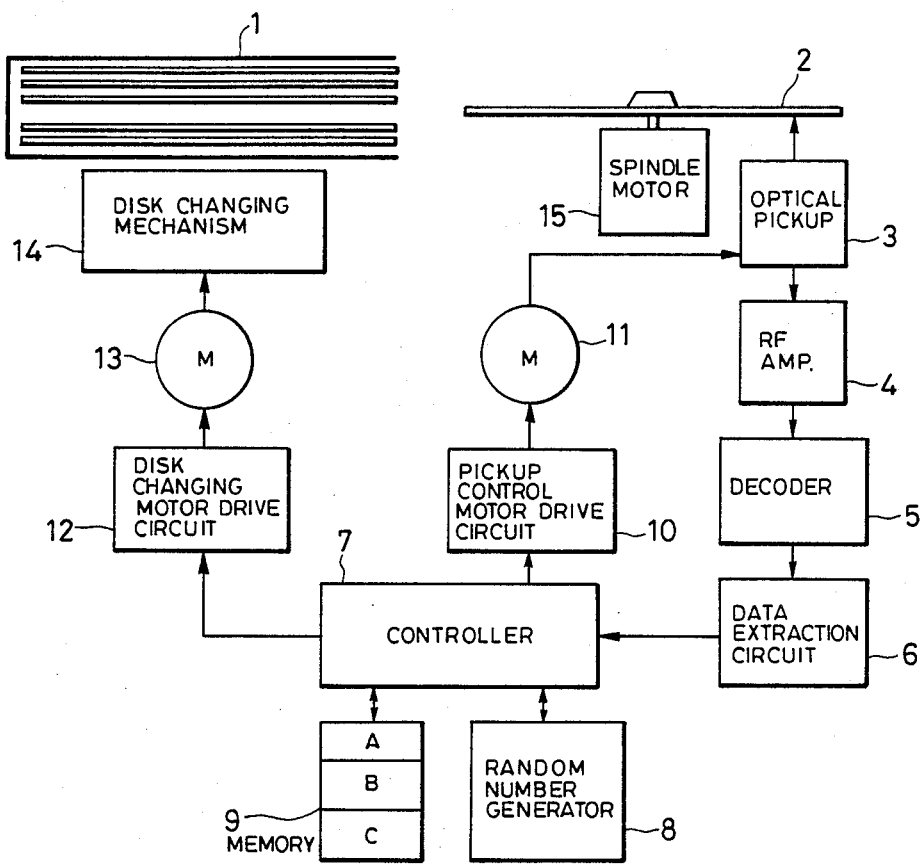
FIG. 1 shows a block diagram describing an embodiment of the present invention.

FIG. 1 is a block diagram of a multi-disk player. Shown at 1 in FIG. 1 is a magazine capable of housing six compact disks. Shown at 2 in FIG. 1 is a reproduced disk horizontally pulled out of the magazine 1 and clamped on the spindle of a motor 15 so as to be rotated for reproduction. Laser light from an optical pickup 3 is directed upon the reproduced disk 2 to read the signal recorded on the disk 2. The signal read from the disk 2 by the pickup 3 is amplified by an RF amplifier 4 and demodulated by a decoder 5, the output from which is supplied to a data extraction circuit 6 in which address information is extracted and supplied to a controller 7. The controller 7 is connected to a random number generator 8 and a memory 9 including a first memory section A for recording identifying data for already-reproduced disks, a second memory B for recording identifying data for already-reproduced tunes on each disk, and a third memory C for storing an incremental count of the number of the already-reproduced tunes on each disk. The controller 7 is also connected to a pickup control motor drive circuit 10 and a disk change motor drive circuit 12. A drive signal is supplied from the controller 7 to the pickup control motor drive circuit 10 so that a pickup moving mechanism (not shown in the drawings) is driven by a pickup control motor 11. A drive signal is supplied from the controller 7 to the disk change motor drive circuit 12 so that a disk change mechanism, which extracts an optionally selected disk from among the disks stored in the magazine 1 and clamps the extracted disk on the spindle of the motor 15, is driven by a disk change motor 13.

Figure 2:
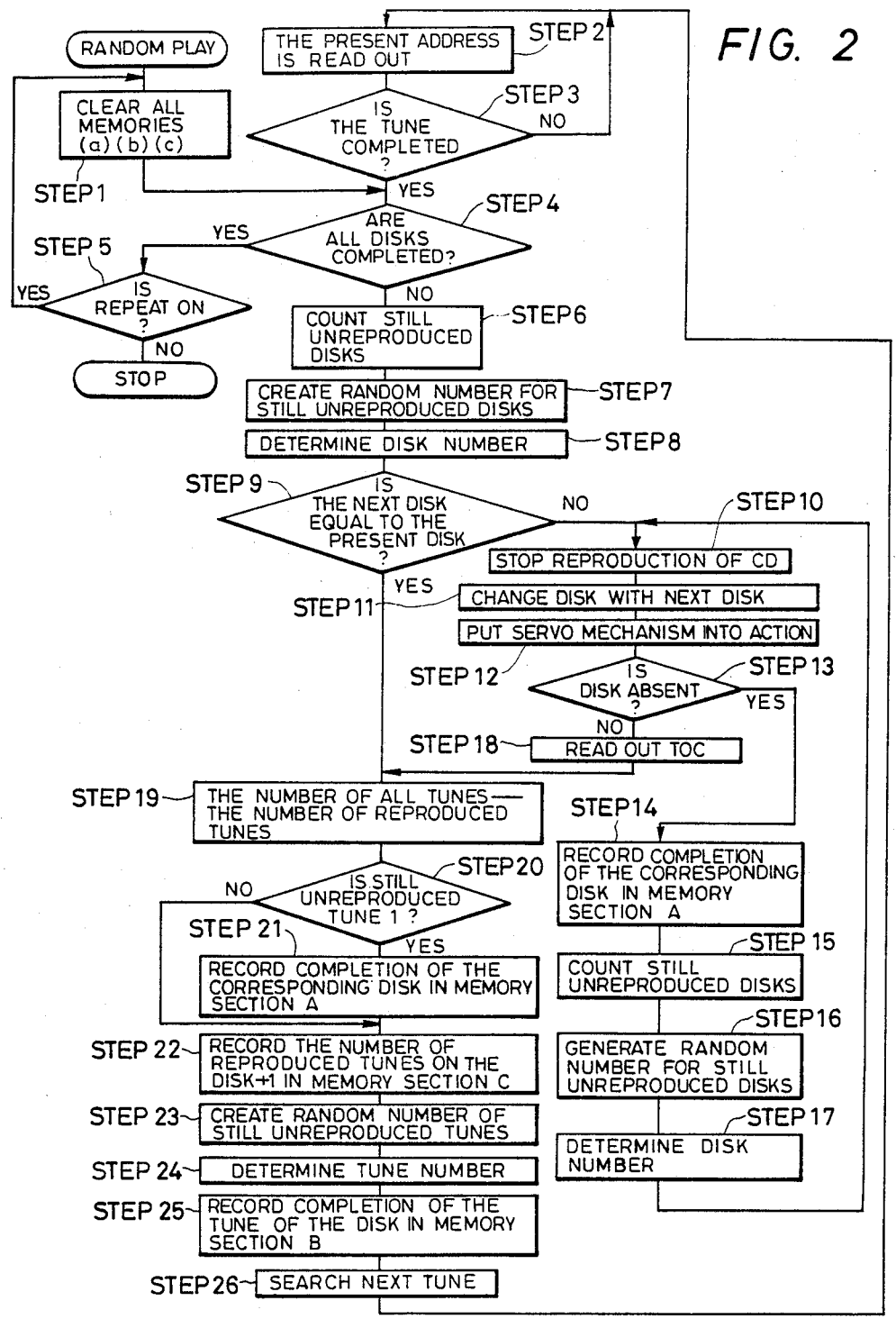
FIG. 2 is a flowchart of the control sequence used in the FIG. 1 embodiment.
Figures 3A, 3B, 3C:
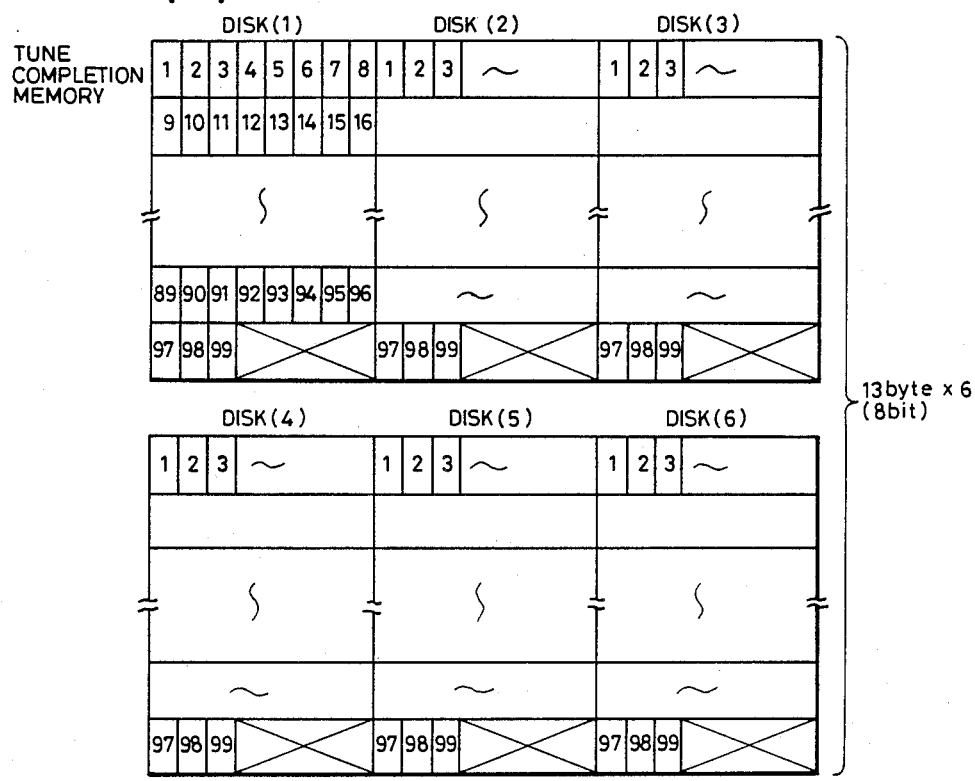
FIGS. 3 a–c shows a map of a memory for recording already-played disks and already-played tunes.

FIG. 2 shows a flowchart describing the operation of the controller 7. FIG. 3 shows a memory map describing the operation of the controller 7. The operation of this embodiment of the inventive multi-disk player will now described with reference to FIGS. 1, 2 and 3.

When a random reproduction start command is issued upon turning on a start switch (not shown), the controller 7 clears the contents of all of the first, second and third memories A, B and C of the memory 9 in a step 1. As described above, the first memory records the completion of the reproduction of each of the disks, and for this purpose has six bits corresponding to the six disks in the magazine 1. For a disk whose tunes have all already been played, the respective one of the six bits is set at "1". The second memory B records the completion of the reproduction of the various tunes on the disks, and has ninety-nine bits for a respective maximum of ninety-nine tunes on each disk. Each of the ninety-nine bits is set to "1" when the respective tune has been played. The third memory C stores a count of the number of the already-played tunes of each disk. The count is increased by one every time one tune is reproduced.

When one of the tunes of one on the disks is being played in a random reproduction mode, address information, inclusive of a disk number and a tune number compiled by the data extraction circuit 6, is read by the controller 7 in step 2 and compared with previously stored address information to judge in step 3 whether or not the playing of the tune has been completed. When it is judged in step 3 that the playing of the tune has been completed, the controller 7 checks the contents of the first memory A to judge in a step 4 whether or not the playing of all disks has been completed. When it is judged in step 4 that the playing of all disks has been complelted, it is judged in a step 5 whether or not the repetition of random playing has been instructed. When it is judged in step 5 that the repetition of random has been commanded, the above process is repeated from step 1. When it is judged in the step 5 that repetition of random playing has not been instructed, all operations of the multi-disk player are stopped.

If it is judged in step 4 that the playing of all disks has not been completed, the number of the as-yet-unplayed disks, as stored in the first memory A, is counted in step 6, and a random number not larger than the counted number is then created by the random number generator 8. To create the random number by the random number generator 8, the output count of a counter which rapidly changes at a prescribed period is latched at an arbitrary timing and restricted by a limiter to the number of the as-yet-unplayed disks in step 7. For example, if the number of as-yet-unplayed disks is four, the number of one of the four as-yet-unplayed disks is extracted. In step 8, the "1" bits of the first memory A are counted, and the bits corresponding to the as-yet-unplayed disks are counted according to the value of the random numbers so that the number of one of the unplayed disks is randomly set.

It is thereafter judged in step 9 whether or not the randomly calculated number is equal to the number of the currently played disk. When it is judged in step 9 that the randomly calculated number is equal to the number of the currently played disk, step 19 is playing. When it is judged in step 9 that the randomly calculated number is not equal to the number of the currently placed disk, the reproduction of the disk is stopped in step 10. In that case, the controller 7 commands the disk change motor drive circuit 12 to return the disk to the magazine 1 using the disk change mechanism 14, and the disk having the randomly calculated number is selected and clamped on the spindle of the motor 15 by the same mechanism in step 11. A command is then applied to a servo circuit for the motor 15, the optical pickup 3, etc., so that the servo system is actuated in step 12. At that time, the locking of the focusing servo mechanism for the optical pickup 3 is detected. Depending on whether the detected locking is OK (i.e., locked) or NG (i.e., not locked), it is judged in step 13 whether or not the disk corresponding to the number randomly calculated in step 8 is present in a tray located in the magazine 1 and corresponding to the randomly calculated number. If it is judged in step 13 that the disk is not present in the tray, the bit of the first memory A, which corresponds to the disk, is set at "1" so that an indication of the completion of the playing of the disk is stored in the memory in step 14. Another number is then randomly calculated in steps 15, 16 and 17, similarly to steps 6, 7 and 8, and step 10 is executed again. When the disk is judged to be present on the tray and the focusing servo mechanism is properly actuated in steps 12 and 13, recorded tune number information (hereinafter referred to as TOC information) recorded on the innermost portion of the recording region of the disk is obtained through the data extraction circuit 6 in step 18.

In step 19, the controller 7 subtracts the number of the already-played tunes on the disk, which number is stored in the third memory C, from the number of all the tunes on the disk, which is obtained from the TOC information, to calculate the number of the as-yet-unplayed tunes on the disk. When it is judged in step 20 that the number of the as-yet-unplayed tunes is one, the bit of the first memory A corresponding to the disk is set to "1" to store an indication of the forthcoming completion of the playing of the disk in the memory in step 21 to complete the playing of all the tunes on the disk upon completion of the current playing operation. Step 22 is then executed. If it is judged in step 20 that the number of the as-yet-unplayed tunes on the disk is two or more, step 21 is skipped and the number of the already-played tunes on the disk, which is stored in the third memory C, is increased by one in step 22.

Subsequently, a random number not larger than the number of the as-yet-unplayed tunes, which is calculated in step 19, is created by the random number generator 8. To create the random number with the random number generator 8, the count of a counter which rapidly changes at a prescribed period is latched at an arbitrary timing and restricted by a limiter in step 23 so that calculation is limited to or below a numerical value corresponding to the number of the as-yet-unplayed tunes. In step 24, the bits of the second memory B for the disk are counted and the appropriate bits for the as-yet-unplayed tunes are counted according to the value of the random number so that the number of one of the unplayed tunes is randomly selected. In step 25, the bit of the second memory section B which corresponds to the tune of the disk is set to "1" so that the forthcoming completion of the playing of the tune is stored in the memory.

When the number of the tune to be played next has been randomly calculated as described above, the controller 7 issues a command to the pickup control motor drive circuit 10, etc., to search for the tune in step 26 and to start playing the tune. Step 2 is thereafter again executed to repeat the same operations.

For a random playing, step 1 is repeated if all the disks have been already-played, or step 6 is executed again if not all the disks have been played.

Although the third memory C constitutes a employed tune counter in the above-described embodiment and is used to determine the number of the unplayed tunes on each disk, the present invention is not limited thereto and may be otherwise embodied so that the third memory C is not provided and the number of the unplayed tunes is calculated by counting the "0" bits in the second memory B.

The once-read TOC information may be all stored in the memory so as to perform the same operation without having to read the TOC information again.

Moreover, although the above-described embodiment relates to a multi-disk player for compact disks, the present invention is not limited thereto and may be also applied to video disk player.

In the disk playing method provided in accordance with the present invention, each disk is randomly selected and the number of tunes on the randomly selected disk is thereafter read the tunes are selectd in such a manner as to randomly play all tunes on all disks without playing any tune twice. Since the already-played disks and the already-played tunes are allotted to specific bits of a memory, the capacity of the memory can be minimized.

What is claimed is:

1. A disk playing method for a multi-disk player in which a plurality of disks are housed in a magazine and said disk are sequentially pulled out and played, comprising the steps of:
 (a) providing a first memory for recording an indication of the completion of playing of each of said disks, a second memory for recording identities of already-played tunes on each of said disks, and a third memory for recording an incremental count of the number of the already-played tunes on said disks;
 (b) randomly selecting an as-yet-unplayed disk in accordance with a random number and on the basis of the contents of said first memory;
 (c) determining whether said randomly selected disk is present;
 (d) when said disk is not present, recording information on the result of said determination in said first memory, and when it is determined that said disk is present, reading information indicative of the number of all the tunes on said disk from said disk said third memory;

(e) subtracting the number of tunes on said disk already-played read from said third memory from that of all the tunes on said disk when the result of said subtraction is one, recording the forthcoming completion of the playing of said disk in a corresponding already-played disk recording region in said first memory, and when the result of said subtraction is two or more, randomly selecting an as-yet-unplayed tune on said disk in accordance with a random number and on the basis of the contents of said second memory, and recording the forthcoming completion of the playing of said randomly selected tune in said second memory; and (f) when the playing of said randomly selected tune is completed, repeating steps (b) to (f) until the contents of said first memory indicate that all tunes on all said disks have been played.

2. The disk playing method of claim 1, further comprising the step of clearing all of said memories at a start of a multi-disk playing operation.

3. The disk playing method of claim 1, wherein said first memory is provided with a single bit for each of said disks.

4. The disk playing method of claim 1, wherein said second memory is provided with one bit for each of a maximum number of tunes on any of said disks.

5. The disk playing method of claim 1, wherein said step of randomly selecting an as-yet-unplayed tune, comprises generating a random number not larger than the number of as-yet-unplayed disks as indicated by the data recorded in said first memory.

6. The disk playing method of claim 5, wherein said step of generating said random number comprises latching the output of a continuously operating counter at an arbitrary timing, and restricting the value thus latched in accordance with said number of as-yet-unplayed disks.

* * * * *